United States Patent [19]

Bonora et al.

[11] 4,026,574
[45] May 31, 1977

[54] COMBINATION KICKSTAND AND FOOTREST

[75] Inventors: Anthony C. Bonora, Palo Alto; Lawrence L. Ray, San Jose, both of Calif.

[73] Assignee: Bolt Vehicles, Inc., Sunnyvale, Calif.

[22] Filed: Nov. 19, 1975

[21] Appl. No.: 633,588

[52] U.S. Cl. .............................. 280/295; 280/301
[51] Int. Cl.² .................................... B62H 1/02
[58] Field of Search .......... 280/301, 291, 298, 294, 280/295

[56] References Cited

UNITED STATES PATENTS

| 1,435,625 | 11/1922 | Schwinn | 280/301 |
| 3,384,389 | 5/1968 | Polley, Jr. | 280/291 |
| 3,554,311 | 1/1971 | Thompson et al. | 280/295 X |

FOREIGN PATENTS OR APPLICATIONS

| 39,188 | 5/1936 | Netherlands | 280/291 |
| 106,365 | 9/1923 | Switzerland | 280/301 |
| 262,985 | 12/1926 | United Kingdom | 280/301 |
| 222,789 | 10/1924 | United Kingdom | 280/301 |
| 256,373 | 8/1926 | United Kingdom | 280/301 |
| 240,264 | 10/1925 | United Kingdom | 280/301 |

Primary Examiner—Robert R. Song
Assistant Examiner—Jack D. Rubenstein
Attorney, Agent, or Firm—Darby & Darby

[57] ABSTRACT

A kickstand for supporting a parked two-wheeled vehicle and a footrest for supporting the feet of the vehicle operator when the vehicle is in motion is provided by a single device comprising a lever pivoted about an axis parallel to the longitudinal axis of the vehicle on a horizontal beam rigidly affixed to the vehicle frame. The center of gravity of the lever portion is located relative to the pivot axis so that the lever portion is stable both when pivoted to contact the ground for vehicle support and when pivoted to a position parallel to the beam to act as a footrest.

2 Claims, 3 Drawing Figures

COMBINATION KICKSTAND AND FOOTREST

BACKGROUND OF THE INVENTION

Two-wheeled vehicles such as motorcyles and bicycles require a means of support when the operator desires to park the vehicle in an upright position. Such means are known to the prior art and are commonly referred to as kickstands. The prior art kickstands generally employ a rod which is pivoted in a supporting member and which is urged between a park position in contact with the ground and a rest position removed from the ground by a spring means.

The springs employed in prior art kickstands often require the operator to exert considerable force in moving the kickstand between park and rest positions. Such springs tend to be subject to wear and rust or corrosion and eventually fail leaving the vehicle without adequate supporting means. Cam shaped devices and complementary detents are commonly used to stabilize the rod members of prior art kickstands in their park or rest positions. Such kickstands have utility only when in the park position and serve no function in the rest position.

Since the path of travel of conventional kickstands between park and rest positions generally has a component parallel to the direction of travel of the vehicle, e.g., along the longitudinal axis of the vehicle, a significant forward force exerted on the vehicle will cause the kickstand to fold from its park position toward its rest position. Such conventional kickstands are inherently poorly suited for parking vehicles on hills even when the grade is only moderate.

Furthermore, conventional kickstands must be assembled from a variety of parts each of which may require a different fabrication process. For instance, a rod member may be cut from elongated steel rods while the supporting member in which the rod is pivoted may be stamped from sheet metal. The interconnecting spring is formed by still a third process and the components must all be assembled with the aid of a variety of fasteners.

In addition to requiring a supporting means when parked, two-wheeled vehicles also must have a means for supporting the operator's feet when in motion. On an operator powered bicycle, the conventional pedals used for propulsion also properly support and position the cyclist's feet. On a vehicle employing a power plant, such as a motorcycle, the support function is accomplished through the use of footrests or foot pegs which are affixed to the vehicle frame. Such footrests generally serve no function when the vehicle is parked and the operator is not seated on the vehicle.

It is not uncommon for an operator to mount a parked two-wheeled vehicle, start the engine, rest his feet on the footrests and propel the vehicle forward without disengaging the kickstand. This is extremely dangerous and can result in serious injury to the vehicle operator and damage to the vehicle.

SUMMARY OF THE INVENTION

The instant invention provides in a single device a combined kickstand and footrest which overcomes the above described deficiencies of prior art kickstands and footrests. More specifically, the instant invention provides a combination kickstand and footrest comprising a lever portion which is pivoted on a horizontal beam portion fixedly mounted to the vehicle frame with the axis of the beam portion transverse to the longitudinal axis of the vehicle and parallel to the ground. The center of gravity of the lever portion is positioned relative to the pivot axis so that a moment is created about the pivot axis urging one end of the lever portion into contact with one side of the beam portion when the lever is in the park position and a countermoment urging the other end of the lever into engagement with another side of the beam when it is in the footrest position. This provides a stable kickstand and footrest without the use of springs, cams, detents or the like.

In the preferred embodiment of the invention both the lever and beam are formed from the same piece of tubing and connected merely by a conventional pivot pin. The pivot axis is parallel to the longitudinal axis of the vehicle thereby preventing the kickstand from folding up under even substantial forward vehicular force. Moreover, since the footrest is not available to the operator when the combination kickstand and footrest is in the park position, the operator, upon mounting the vehicle, is warned by the absence of the footrest that the kickstand has not been disengaged. He is, therefore, less likely to attempt to ride off with the kickstand in the park position.

It is therefore an object of the invention to provide a device which can serve as both a kickstand a footrest for a two-wheeled vehicle.

Another object of the invention is to provide a device that can be transformed from a kickstand to a footrest and back to a kickstand with a minimum of operator effort.

Still another object of the invention is to provide a combined kickstand and footrest which can be fabricated from a minimum of parts and with a minimum of labor.

A further object of the invention is to provide a combined kickstand and footrest which is stable in either of its operative positions without the use of springs, detents, cams or the like.

Still a further object of the invention is to provide a combined kickstand and footrest which will not collapse when the vehicle on which it is mounted is moved.

Other and further objects of the invention will be apparent from the following drawings and description of a preferred embodiment in which like reference numerals are used to indicate like parts in the various views.

DESCRIPTION OF THE PREFERRED EMBODIMENT

Figure 1:
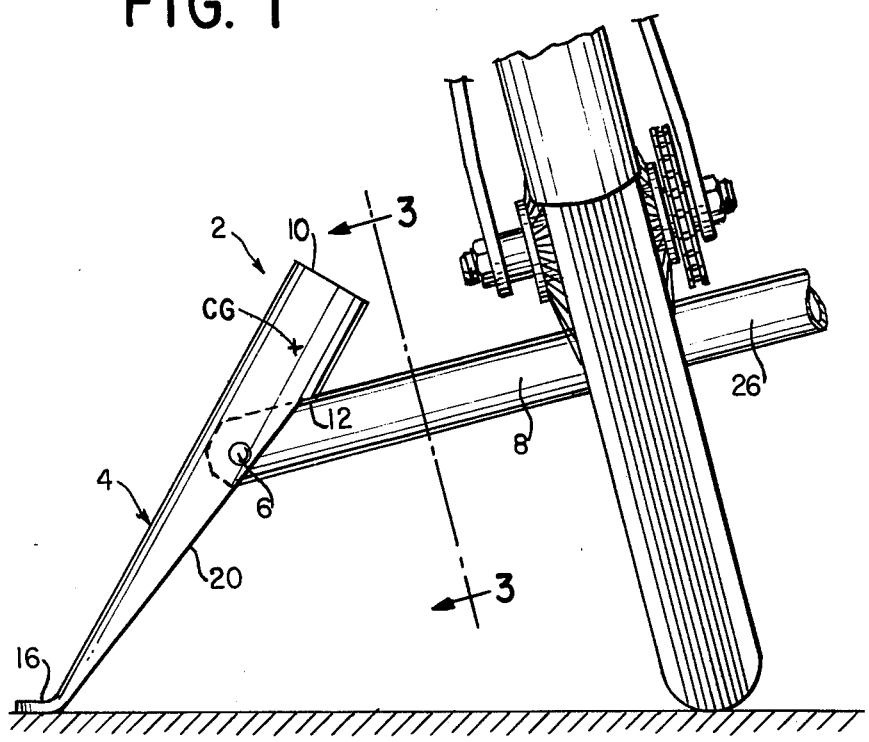
FIG. 1 is a rear elevation of the combination kickstand and footrest used on a two-wheeled vehicle in the park position.

Referring now to the drawings, a combination kickstand and footrest 2 for use with a two-wheeled vehicle comprises a lever 4 hinged by a pin 6 adjacent one end of a beam 8. The other end 26 of the beam 8 can support one foot of the vehicle operator. The pin 6 provides a pivot axis about which the lever 4 is rotated relative to the beam 8.

The lever 4 and beam 8 are preferably formed from the same piece of material for ease of fabrication. The material may be flat stock or, as is shown in the drawing of the preferred embodiment, rigid tubing. Any rigid material may be used to form the combination kickstand and footrest 2 as for example any rigid metal or plastic. Steel has been found to have the desired properties and is used in the preferred embodiment.

The beam 8 is mounted on the vehicle frame at a point approximately midway between the longitudinal extremities of the vehicle, that is beneath the vehicle's center of gravity, with its longitudinal axis transverse to the longitudinal axis of the vehicle and parallel to the ground when the vehicle is in an upright position.

The lever 4 is formed by cutting away a portion of the tubing wall. The cut, which may be linear, is begun at a point on the periphery of the tubing axially displaced from one end 10 of the tubing at a point 12 and continuing in a direction oblique to the longitudinal axis of the tubing such that the remaining wall of the tubing tapers toward its other end 14 from which a portion 16 is outwardly bent to form a platform for engaging the ground when the combination kickstand and footrest 2 is in the park position. The circumference of the untapered portion 26 adjacent the end 10 of the lever 4 serves as a rest for the other foot of the vehicle operator. As can be seen from the drawings, the uppermost surfaces of the lever 4 and beam portion 26 are substantially level to permit the vehicle operator's feet to be substantially levelly positioned when the combination kickstand and footrest 2 is in the configuration shown in FIG. 2. This configuration of the lever may also be achieved by casting metal or plastic in the desired shape or machining a piece of stock.

Figure 3:
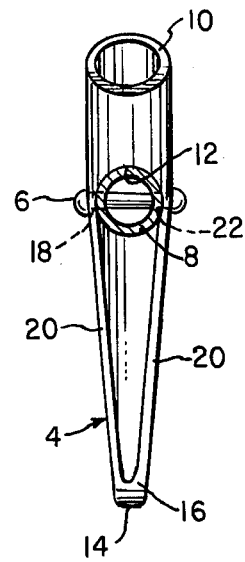
FIG. 3 is a section taken along the line 3—3 of FIG. 1.

A hole 18 is bored through the opposing circumferential walls of the lever 4 defining a pivot axis parallel to the plane formed by the edges 20 (see FIG. 3) left by the tapered cut in the lever member 4.

The lever member 4 is formed with its center of gravity CG intermediate the pin 6 defining the pivot axis of the combination kickstand and footrest 2 and the end 10 of the lever. The center of gravity CG of the lever 4 may be located by suitable choice of the point 12 at which the taper cut is made and the angle and length of the taper cut.

The horizontal beam 8 has formed in it holes 22 passing through opposing circumferential walls to align with the holes 18 of the lever 4 and to accept the pin 6. Preferably, the pivot axis formed by the pin 6 intersects or is closely adjacent the longitudinal axes of both the lever 4 and horizontal beam 8. The pivot axis may be offset from the longitudinal axis of the lever 4 by an amount sufficient to allow for the thickness of the wall of the lever 4.

Figure 2:
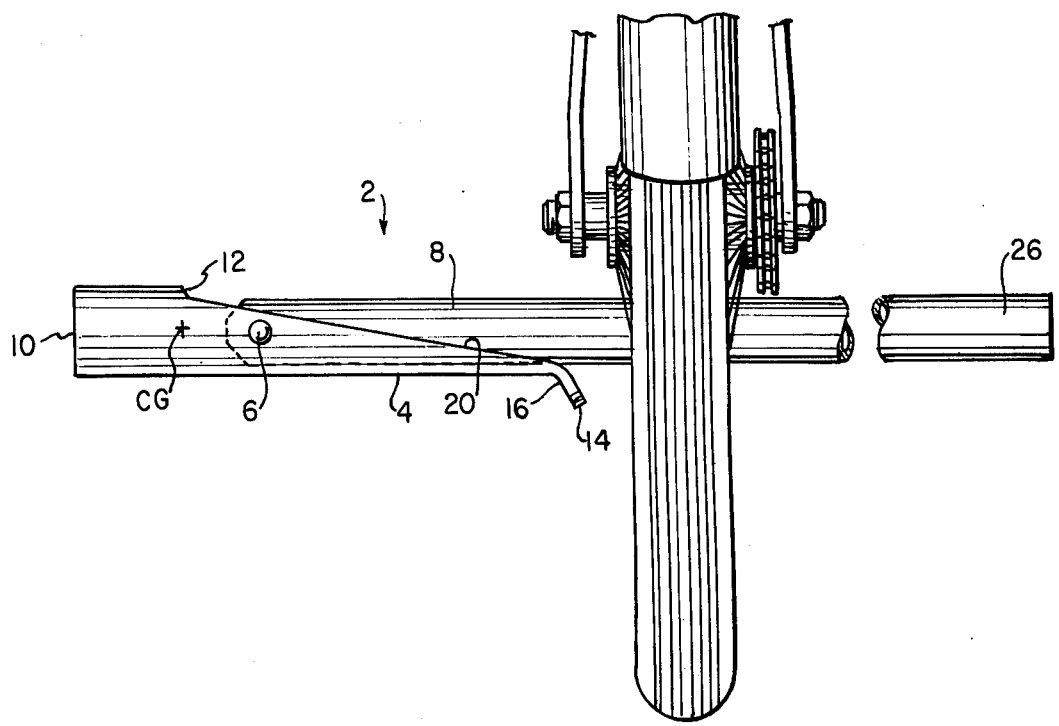
FIG. 2 is a rear elevation of the combination kickstand and footrest in the rest position used on a two-wheeled vehicle.

By aligning the holes 18 and 22 as described above, the inner wall of the lever 4 may be caused to engage the outer wall of the horizontal beam 8 when the combination kickstand and footrest is in the footrest position as shown in FIG. 2. This prevents rotation of the lever 4 about pin 6 in a counter-clockwise direction in the view of FIG. 2 thereby permitting the lever 4 to support the weight of the vehicle operator's foot. The offset of the center of gravity CG from the pin 6 creates a counterclockwise moment about the pin 6 thereby urging the lever 4 in a counterclockwise direction and resisting any incidental force which may tend to rotate the lever 4 clockwise from its footrest position.

To move the lever 4 from its footrest position as shown in FIG. 2 to its park position as shown in FIG. 1, the operator need only exert an upward force near the end 10 of the lever 4, as with the top of his foot, the force being of sufficient magnitude to overcome the weight of the lever 4 concentrated at the center of gravity CG and minimal friction about the pin 6. Once the center of gravity CG passes over the pin 6 to the position shown in FIG. 1, the moment exerted about the pin 6 becomes a clockwise one from the point of view of FIGS. 1 and 2. Thus the lever 4 is urged to rotate clockwise about the pin 6 until the region where edges 20 meet adjacent the point 12 of the lever 4 engages the outer wall of the beam 8. This prevents further clockwise rotation of the lever 4 about the beam 8. The weight of the vehicle as it leans toward the combination kickstand and footrest 2 in the park position causes an upward force to be exerted by the ground against the platform portion 16 of lever 4. This results in a clockwise moment about the pin 6 which is resisted by the horizontal beam 8 thus providing support for the vehicle.

To return the combination kickstand and footrest to the footrest position, the operator need only straighten up the vehicle raising the platform 16 from the ground and kick the end 10 of the lever 4 in a counterclockwise direction away from the vehicle until the center of gravity CG passes over the pin 6 at which time the moment exerted by the center of gravity about the pin 6 becomes counterclockwise again urging the lever 4 to its footrest position as shown in FIG. 2.

It will be appreciated that the objects of the invention have been accomplished. Safety is enhanced as the operator of the vehicle has no place to position or support his foot when the lever 4 is in the park position of FIG. 1. When the operator mounts the vehicle and immediately notices the absence of the footrest, all he need do is gently kick over the end 10 of the combination kickstand footrest 2 thereby pivoting the lever 4 counterclockwise into the footrest position. This arrangement inherently prevents the operator from operating the vehicle with the kickstand in the park position. Safety is further enhanced by the fact that the pivot axis about which the lever 4 is rotated relative to the beam 8 is parallel to the longitudinal axis of the vehicle thereby preventing the kickstand from being upset when a longitudinal force is applied to the vehicle as for example when the vehicle is parked on a hill.

The combination kickstand and footrest is both easy to operate, there being no spring forces to overcome, and to produce. The device may be formed from only two parts, a pivot pin 6 and a fabricated piece of tubing or flat stock. The combination kickstand and footrest in addition to possessing the utility heretofore described presents an attractive appearance in both the park and footrest positions and does not interfere with operation of the vehicle on which it is mounted.

The previously described preferred embodiment may be altered without departing from the invention which is to be limited only by the following claims.

What is claimed is:

1. A combination kickstand and footrest apparatus for a two-wheeled vehicle having a park position and a footrest position comprising:
   a first elongated horizontal member rigidly mounted on said vehicle with its longitudinal axis substantially transverse to the longitudinal axis of the vehicle, and a second elongated member rotatably mounted on said first member with the axis of rotation between said members substantially parallel to the longitudinal axis of said vehicle, a length of said second member on one side of said axis being adapted to support the foot of the operator of the vehicle and the end of said second member on the opposite side of said axis of rotation adapted to engage the ground to support said vehicle in a substantially upright position, the center of gravity of said member being intermediate said axis of rotation and the end on said one side whereby said end on said one side is urged downward toward said first member when said apparatus is in said park position and said end on said other side is urged upward toward said first member when said apparatus is in said footrest position, said second member being elongated and hollow throughout at least a portion of its length and having an opening in its wall adapted to receive said first member with said second member partially encompassing said first member and the longitudinal axis of said second member substantially parallel to the longitudinal axis of said first member and in pressing engagement therewith when said apparatus is in the footrest position.

2. A combination kickstand and footrest apparatus for a two-wheeled vehicle having a park position for supporting said vehicle and a footrest position for supporting the feet of the vehicle operator comprising;

a first tubular member rigidly mounted to said vehicle with its axis substantially transverse to the longitudinal axis of the vehicle and substantially parallel to the ground when the vehicle is in an upright position with one end of said first member extending from one side of said vehicle adapted to support one foot of the vehicle operator, the other end of said first member extending from the other side of said vehicle, and a second tubular member rotatably mounted adjacent the other end of said first member, the axis of rotation between said members being substantially parallel to the longitudinal axis of said vehicle, said second member having an opening in its outer wall in which said other end of said first member is received and in which a portion of the length of said first member adjacent its other end is disposed with its axis substantially parallel to the axis of said second member when said apparatus is in the footrest position, said second member having a portion at one of its ends adapted to support the other foot of the vehicle operator when said apparatus is in the footrest position and a tapered portion terminating in a platform adapted to engage the ground for supporting said vehicle in a substantially upright position at the other of its ends, the uppermost surface of said foot supporting portion of said second member being substantially level with the uppermost surface of said first member whereby the vehicle operator's feet can be substantially levelly positioned, one on said first member and the other on said second member when said apparatus is in the footrest position, the center of gravity of said second member being intermediate said one end and said axis of rotation whereby said one end of said second member is urged by a moment about said axis of rotation toward said first member when said apparatus is in the park position and said other end of said second member is urged by a countermoment toward said first member when said apparatus is in the footrest position.

* * * * *